United States Patent [19]

Hoffeins

[11] Patent Number: 5,378,029

[45] Date of Patent: Jan. 3, 1995

[54] CONNECTING DEVICE

[76] Inventor: Wolfgang Hoffeins, Obere Paulusstr. 71, 7000 Stuttgart 1, Germany

[21] Appl. No.: 70,712

[22] Filed: May 28, 1993

[30] Foreign Application Priority Data

May 30, 1992 [DE] Germany ............................. 4217951

[51] Int. Cl.$^6$ ............................................. E05C 19/10
[52] U.S. Cl. ....................................... 292/30; 292/8; 292/37; 292/106
[58] Field of Search ................. 292/29, 30, 37, 41, 292/8, 106, 150

[56] References Cited

U.S. PATENT DOCUMENTS

| 1,836,209 | 12/1931 | Viehueger | 292/37 X |
| 4,376,379 | 3/1983 | Gotanda | 292/37 X |
| 4,964,660 | 10/1990 | Prevot et al. | 292/37 |
| 5,174,617 | 12/1992 | Huber et al. | 292/106 X |

FOREIGN PATENT DOCUMENTS

3602686 8/1987 Germany .
3812179 10/1989 Germany .

Primary Examiner—Rodney M. Lindsey
Attorney, Agent, or Firm—Robert W. Becker & Associates

[57] ABSTRACT

A connecting device for a fastening element with a through bore has a housing and a first pulling member slidably connected within the housing. The pulling member comprises a hook for penetrating the through opening and engaging an edge of the through opening from behind. An actuator is connected within the housing for moving the pulling member from an initial position into a clamping position. In the clamping position, the hook exerts a force directed toward the housing onto the edge. At least one pressurizing member is slidably connected within the housing so as to be movable into the clamping position. The pressurizing member has at least one section resting at the fastening element in the clamping position. The pulling member is clamped between the pressurizing member with the fastening element interposed. A device for securing the hook against displacement relative to the through opening of the fastening element is provided.

32 Claims, 10 Drawing Sheets

CONNECTING DEVICE

BACKGROUND OF THE INVENTION

The present invention relates to a connecting device for a fastening element having a through opening. The connecting device comprises a housing and a first pulling member that is slidably connected within the housing. The first pulling member comprises a hook for penetrating the through opening and engaging an edge of the through opening from behind. An actuator is connected within the housing for moving the first pulling member from an initial position into a clamping position. In the clamping position the hook exerts a force onto the edge of the through opening, whereby the force is directed toward the housing.

Such a connecting device is known from German Patent 38 12 179. In this device the hook of the pulling member engages from behind the edge of the through opening of a fastening element that is in the form of a support. With an actuator in the form of an eccentric the pulling member is returned into the housing so that the edge of the through opening of the support is clamped between the hook of the pulling member and the housing. The through opening is substantially wider than the hook so that even in the clamped position there is a risk that the connecting device is displaced relative to the support such that the hook is located at the level of the through opening and can then fall out when treated incorrectly.

It is therefore an object of the present invention to improve the aforementioned connecting device such that, on the one hand, the connecting device can be mounted to and removed from the fastening element in a simple manner and, on the other hand, is secured in the clamping position to the fastening element such that an accidental loosening of the connecting device from the fastening element is prevented.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The connecting device for a fastening element with a through opening according to the present invention is primarily characterized by:

A housing;

A first pulling member slidably connected within the housing, the first pulling member comprising a hook for penetrating the through opening and engaging an edge of the through opening from behind;

An actuator connected within the housing for moving the first pulling member from an initial position into a clamping position, wherein the hook in the clamping position exerts a force onto the edge, the force directed toward the housing;

At least one pressurizing member slidably connected within the housing so as to be movable into the clamping position, the pressurizing member having at least one section resting at the fastening element in the clamping position;

The first pulling member being clamped against the pressurizing member with the fastening element interposed; and A means for securing the hook against displacement relative to the through opening of the fastening element.

With the inventive connecting device the housing is no longer directly involved in the clamping action. The edge of the through opening of the fastening element is instead clamped between the hook of the pulling member and the pressurizing member. Accordingly, for the mounted connecting device the forces are received by the pressurizing member so that the housing is substantially relieved. Thus, it is prevented that the housing is damaged by occurring loads. The inventive connecting device for this reason has a long service life. The hook of the pulling member is secured in the through opening of the fastening element against displacement. Accordingly, it is reliably prevented that even under great loads the connecting device can be displaced relative to the fastening element.

In a preferred embodiment, the pressurizing member is slidably connected within the housing. Preferably, the device further comprises a control slide operatively connected to the pressurizing member for displacing the pressurizing member within the housing. Advantageously, the control slide is forcibly displaced by the actuator. The control slide expediently comprises a toothing and the actuator comprises a toothed wheel, wherein the toothing cooperates with the toothed wheel.

In a further embodiment of the present invention, the housing has sidewalls and the actuator is rotatably supported within the sidewalls. Preferably, the actuator extends through the pressurizing member, and the pressurizing member has at least one slotted hole through which the actuator extends.

Advantageously, the means for securing the hook comprises a locking member actuated by the control slide, the locking member cooperating with the first pulling member for securing the hook. Preferably, the locking member is fixedly connected to the control slide. Expediently, the locking member and the control slide are one unitary part.

In another embodiment of the present invention, the device further comprises a second pulling member having a hook. The first and the second pulling members are slidable relative to one another. One of the pulling members is moved with the locking member into a locked position, whereby this pulling member has a slanted control surface that is slanted relative to a direction of displacement of the locking member, the one pulling member being displaced into that locked position relative to the other via the slanted control surface by the locking member. Preferably, the particular pulling member is controllably slidable by the control slide. The control slide preferably has two guide slots and the one pulling member has two pins whereby each pin engages one of the guide slots.

Preferably, the device further comprises a safety device for securing the pressurizing member in the clamping position against displacement. The safety device is preferably a locking slide that is controllably displaced into a securing position by the control slide. The control slide has at least one pin and the locking slide has at least one guide slot, whereby the pin engages the guide slot. Expediently, the locking slide has a locking projection that rests in the securing position at the actuator.

In another embodiment of the present invention the pressurizing member has a recess in which recess the locking slide is positioned such that the locking slide is unmovable in a direction of movement of the pressurizing member. The locking slide is displaceable in the direction transverse to the direction of movement of the pressurizing member.

Preferably, the safety device is connected to the control slide. Expediently, the safety device and the control slide are one unitary part. In a securing position the safety device is held between an abutment of the pressurizing member and the actuator.

Preferably, the first and the second pulling members are connected one another so as to form one unitary part.

One of the first and the second pulling members has a follower for displacing the first and the second pulling members together into the clamping position. The other one of pulling members rests at the follower.

Preferably, the actuator comprises an eccentric for displacing the follower. The first and the second pulling members are connected by a cross member. In a further embodiment of the present invention, the actuator comprises an eccentric cooperating with a cross bar for displacing the pulling member into the clamping position.

Expediently, the device further comprises a spring for biasing the pressurizing member counter to a direction of displacement into the clamping position.

DESCRIPTION OF PREFERRED EMBODIMENTS

The present invention will now be described in detail with the aid of several specific embodiments utilizing FIGS. 1 through 14.

Figure 8:
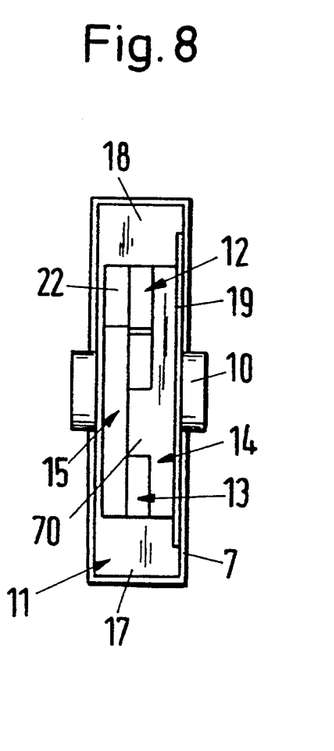
FIG. 8 shows a section along the line VIII—VIII of FIGS. 2a-2c.
Figure 9:
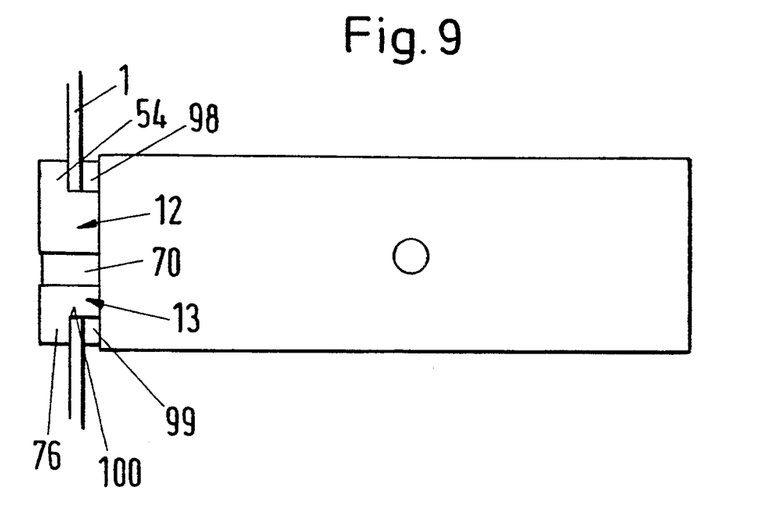
FIG. 9 is a schematic representation of the connection of the inventive connecting device to a vertical support.
Figure 10:
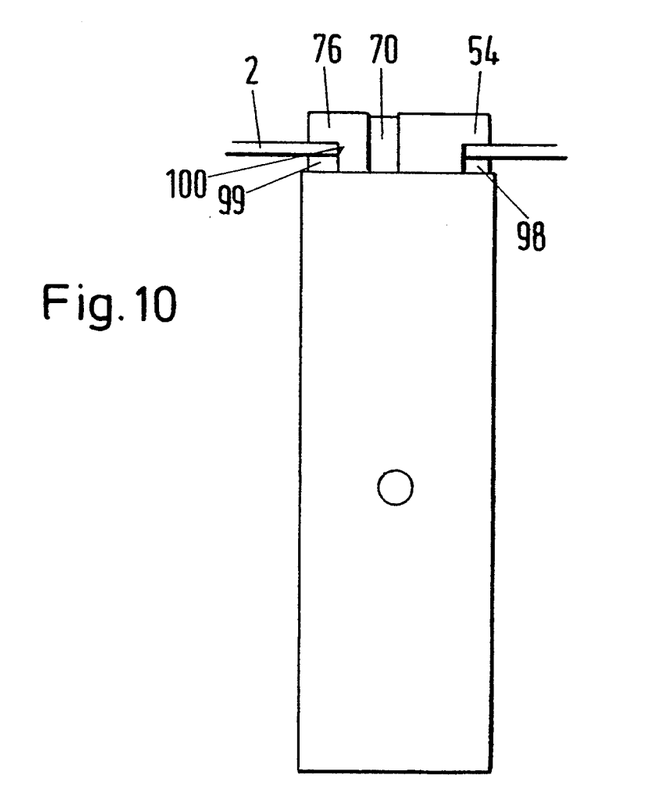
FIG. 10 is a schematic representation of the connection of the inventive connecting device to a horizontal construction component.

The connecting device according to FIGS. 1 to 14 can be connected to horizontal, vertical or slantedly arranged construction components. FIGS. 9 and 10 show exemplary how the connecting device is connected to a vertical support 1 (FIG. 9) or to a horizontal construction component 2 etc. The support 1 can be a correspondingly designed profiled tube, a profiled rod etc. or also a wall, a panel, a rail etc. The construction component 2 can also be such a profiled tube, a profiled rail etc. With the connecting device it is possible to detachably connect, for example, supporting elements, holders, lamps etc. at the support 1, respectively, at the construction component 2.

Figure 1:
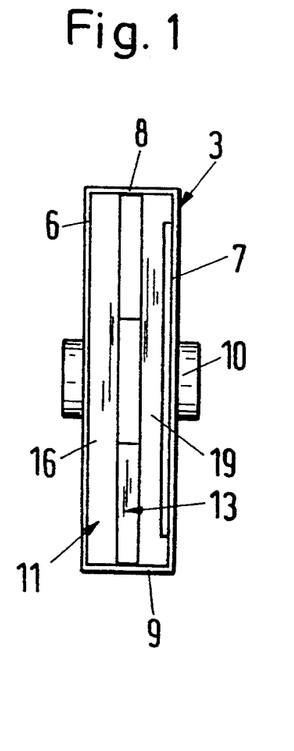
FIG. 1 is an end view of the inventive connecting device.
Figure 2A:
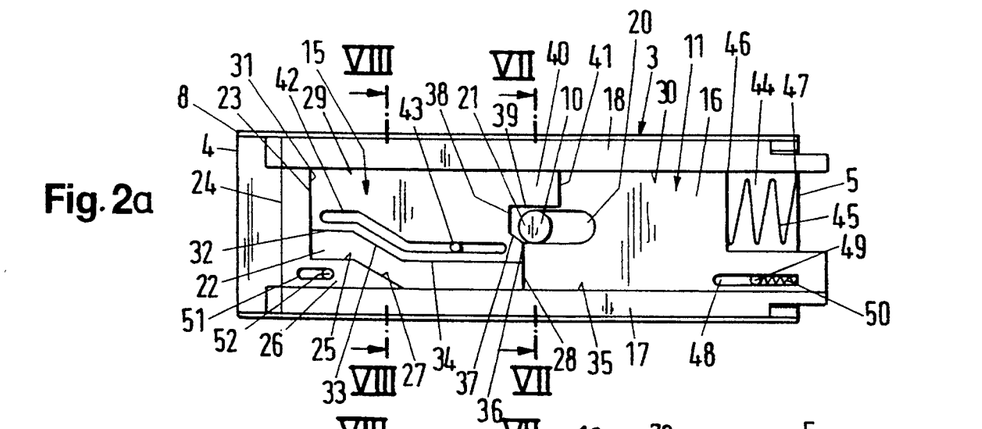
FIGS. 2a-2c show three views of the connecting device at different section levels in which the individual components are in their initial position.
Figure 2B:
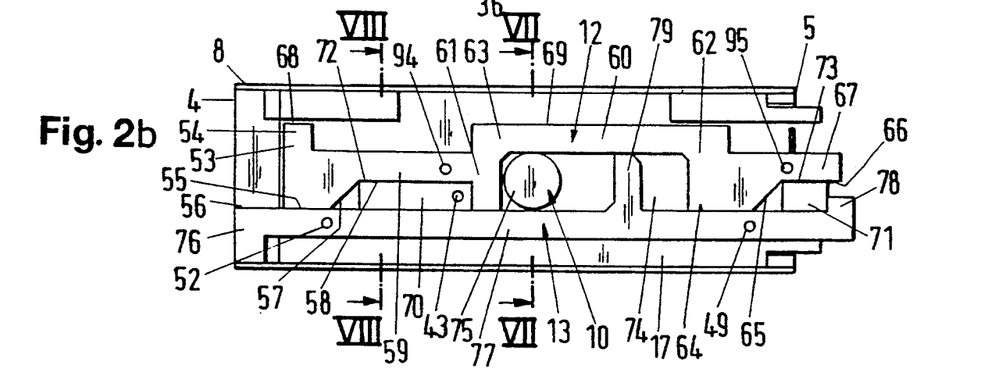
Figure 2C:
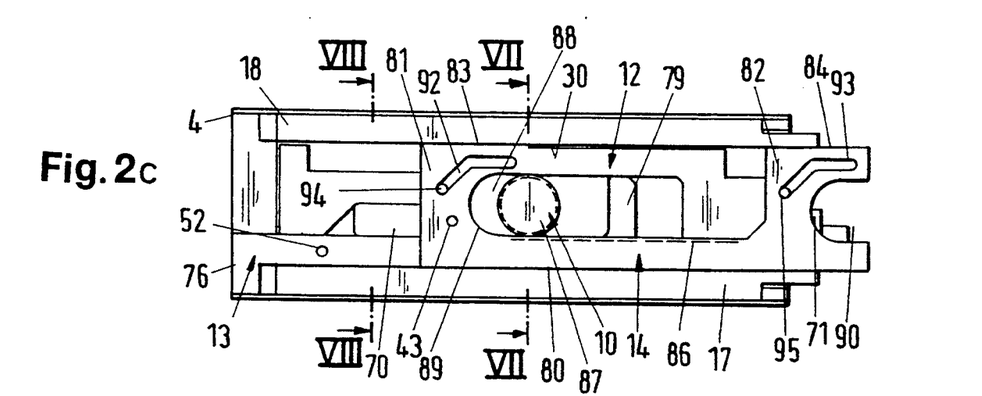

The connecting device according to FIGS. 1 to 8 has a housing 3 that is of a rectangular cross-section and that is open at the end faces 4 and 5 (FIG. 2). The housing 3 has parallel sidewalls 6 and 7 (FIG. 1) which are connected by narrow sidewalls 8 and 9. The sidewalls 6 and 7 are penetrated by an actuator 10 with which the individual components arranged within the housing 3 are to be displaced for connecting the connecting device to the support 1 or the construction component 2.

Figure 6A:
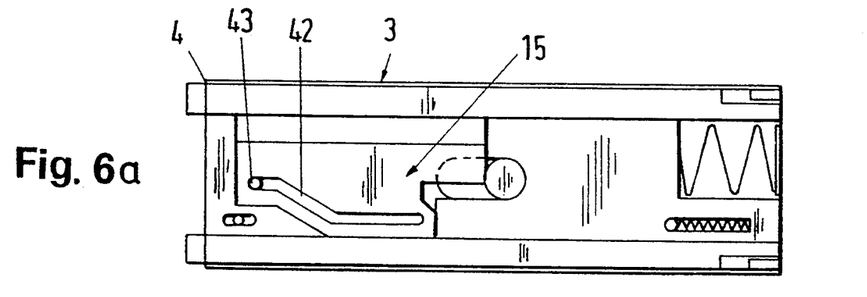
Figure 6B:
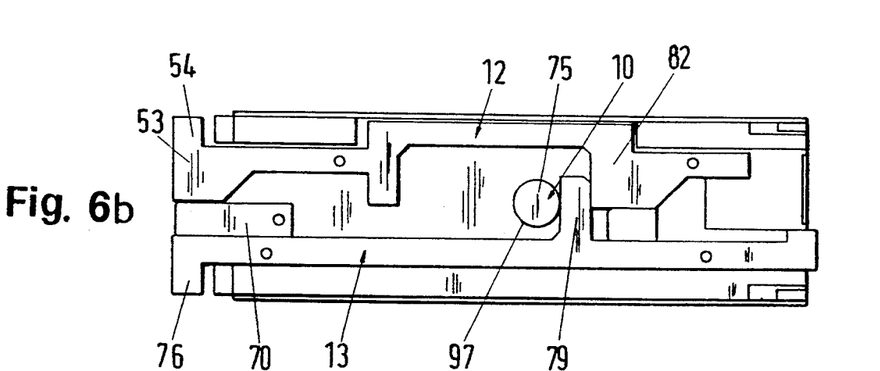
Figure 6C:
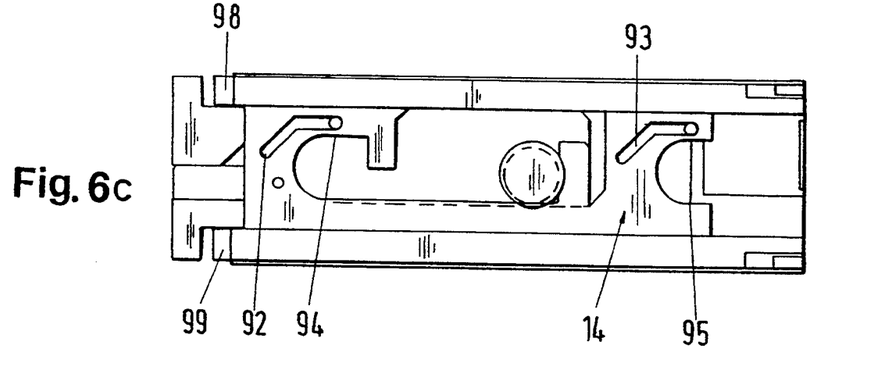
Figure 7:
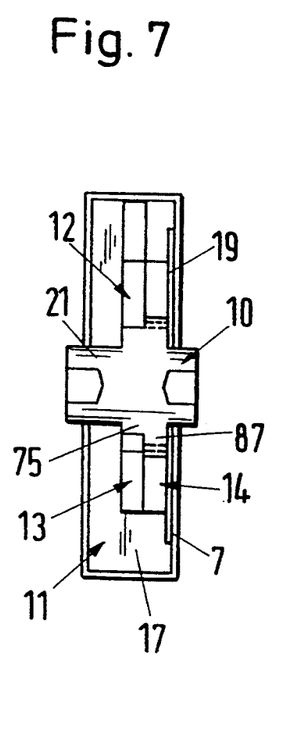
FIG. 7 shows a section along the line VII—VII in FIGS. 2a-2c.

Within the housing 3 a pressurizing member 11, two pulling members 12 and 13, a control slide 14, and a locking slide 15 are positioned. As is shown in FIGS. 1, 7, 8, these individual components are essentially arranged in three different sectional planes. For this reason, FIGS. 2a-2c to 6 show these three different planes of the individual components separately in order to facilitate understanding of the drawings.

FIGS. 2a-2c shows the connecting device in its initial position in which the aforedescribed components do not extend past the open end face 4 of the housing 3. The pressurizing member 11 comprises a gliding portion 16 resting at the inner wall surface of the sidewall 6 and extending over the entire height of the sidewall 6 between the sidewalls 8 and 9 (FIGS. 1 and 2a-2c). At the upper and lower longitudinal edge the gliding portion 16 extends to the oppositely arranged inner sidewall of the sidewall 7 (FIGS. 2a-2c, 7, 8). For this purpose, the gliding portion 16 is provided with respective connecting pieces 17 and 18. The connecting pieces 17, 18 which rests at the inner wall surface of the housing sidewalls 8 and 9, connect the gliding portion 16 with a further gliding portion 19 of the pressurizing member 11. The gliding portion 19 rests at the inner wall surface of the housing sidewall 7 (FIGS. 1, 2a-2c, 8).

The two gliding portions 16, 19 are provided with a slotted hole which preferably is arranged at half the height of the gliding portions and extends in the longitudinal direction of the housing 3. In FIG. 2a only the slotted hole 20 of the gliding portion 16 is represented. The actuator 10 has a circular bearing part 21 which penetrates the slotted hole 20. The width of the slotted hole 20 corresponds advantageously to the diameter of the bearing part 21. The length of the slotted hole 20 determines the displacement distance of the pressurizing member 11 within the housing 3. In the initial position according to FIGS. 2a-2c the pressurizing member 11 rests with the left portion of the slotted hole 20 at the bearing part 21 (see FIGS. 2a-2c).

As is shown in FIG. 2a, the gliding portion 16 is provided with a recess 22 (FIG. 2a) in which the locking slide 15 is displaceably supported. The contour of the recess 22 is substantially adapted to the contour of the locking slide 15. As shown in FIG. 2a the recess 22 is positioned close to the end face of the gliding portion 16 that is facing the housing end face 4. Instead of the recess 22, the gliding portion 16 can also be provided with a respective depression so that the locking slide 15 does not contact the inner wall surface of the housing sidewall 6. As shown in FIG. 8, in the first embodiment a recess 22 is provided for the locking slide 15 which at the bottom side is delimited by a portion of the gliding portion 16 that is reduced in its thickness. The recess 22 has an edge 23 extending perpendicularly to the longitudinal extension of the housing (FIG. 2a) which is parallel to the edge 24 of the pressurizing member 11 as well as parallel to the end face 4 of the housing. The edge 23 extends vertically from the connecting piece 18 in the direction to the connecting piece 17. Spaced at a distance from the connecting piece 17 the edge 23 has a transition into the upper side 25 of the abutment 26 that is provided at the connecting piece 17. The upper side 25 extends in the longitudinal direction of the housing 3 toward the end face 5 of the housing and connects with a slanted surface 27 that extends at an obtuse angle to the upper side of the connecting piece 17. The transition of the slanted surface 27 at the upper side of the connecting piece 17 is approximately located at half the height of the recess 22. Approximately at the level of the left end of the slotted hole 20 in FIG. 2a, the recess 22 is delimited by an edge 28 that extends parallel to the edge 23 and toward the slotted hole 20.

The locking slide 15 is a stamped part the thickness of which corresponds to the depth of the recess 22. As shown in FIGS. 2a–2c, the locking slide 15 has a planar longitudinal edge 29 with which it rests in the initial position at the underside 30 of the connecting piece 18 of the pressurizing member 11. The longitudinal edge 29 has a right angle transition at the housing end face 4 into an edge 31 with which the locking slide 15 rests at the edge 23 of the recess 22. Spaced from the upper side 25 of the abutment 26 the edge 31 has a transition at a right angle into an abutment edge 32 which is parallel to the upper side 25 of the abutment 26 and has the same length. The abutment edge 32 has an obtuse transition into a slanted surface 33 which is parallel to the slanted surface 27 of the abutment 26 and has the same length. The slanted surface 33 connects with a planar abutment surface 34 which is parallel to the upper side 35 of the connecting piece 17. The abutment surface 34 has a transition at a right angle into a guide edge 36 with which the locking slide 15 rests at the edge 28 of the recess 22. The guiding edge 36 extends parallel to the edge 31 and is relatively short, It connects at an obtuse angle with a slanted surface 37 which extends in the direction toward the edge 31 and connects at an obtuse angle to the bottom 38 which is parallel to the edges 31 and 36 and recessed relative to the guiding edge 36. The bottom 38 connects at a right angle to the underside 39 of a locking projection 40 which extends past the guiding edge 36 in the direction toward the housing end face 5 and, in the initial position according to FIG. 2a, engages the bearing part 21 of the actuator 10. The underside 39 extends parallel to the abutment surface 34 and is connected via an end face 41, extending at a right angle to the underside 39, to the longitudinal edge 29.

Spaced at a short distance to the abutment edge 32, the slanted surface 33, and the abutment surface 34, the locking slide 15 is penetrated by a guiding slot 42 which extends parallel to the surfaces 32 to 34. A pin 43 of the control slide 14 extends into the guide slot 42. The pin 43 in the initial position of the control slide 15 is positioned within the portion of the guide slot 42 that is adjacent and parallel to the upper side of the connecting piece 17.

The pressurizing member 11 with the gliding portions 16, 19 and the connection pieces 17, 18 is preferably comprised of plastic material and is advantageously made as one unitary part. The gliding portion 16 is provided with an open recess 44 (FIG. 2a) on its end facing the housing end face 5 in which a pressure spring 45 is positioned. The spring 45 rests with one end at the bottom 46 of the recess 44 and with the other end at a projection 47 at the housing.

The gliding portion 16, in the area between the recess 44 and the connecting piece 17, has a slotted hole 48 which extends parallel to the connecting piece 17 and through which an abutment 49 of the pulling member 13 projects. At the abutment 49 a pressure spring 50 is supported which is positioned within the slotted hole 48 and arranged between the abutment 49 and the end of the slotted hole adjacent to the housing end face 5.

Within the abutment 26 of the gliding portion 16 a further slotted hole 51 is provided that also extends parallel to the connecting piece 17, but is shorter than the slotted hole 48. The slotted hole 51 is engaged by a pin 52 which extends perpendicularly from the pulling member 13. In the initial position according to FIG. 2 the pin 52 is located within the slotted hole 51 at its end facing the housing end face 5.

The two pulling members 12 and 13 are slidably supported on the gliding portion 16 and also partially on the locking slide 15. The two pulling members are advantageously provided in the form of stamped parts so that they are easy to manufacture.

The pulling member 12 has a hook 53 at its end facing the housing end face 4 having a hook leg 54 extending in the direction toward the housing sidewall 8. The hook leg 54 ends at a distance from the housing sidewall 8 (FIG. 2b). The hook 53 in the initial position according to FIG. 2 rests with its planar underside 55 on the planar upper side 56 of the pulling member 13. Within the area of the underside 55 the hook 53 is substantially wider than in the area of the hook leg 54 so that the pulling member 12 can receive high forces. Since the pulling member 12 is relatively thin and the forces resulting from the operation of the connecting device act in the plane of the pulling member 12 the pulling member 12 has, due to its wide hook 53, a high resistance moment.

The underside 55 of the hook 53 has a transition into a slanted surface 57 which extends in the direction toward the housing sidewall 8 which, in turn, has a transition into a planar abutment surface 58 of a narrow stay 59. The stay 59 which extends parallel to the connecting piece 17 of the pressurizing member 11 connects the hook 53 with a U-shaped intermediate piece 60 having legs 61 and 62 that, in the initial position according to FIG. 2, rest on the upper planar side 56 of the pulling member 13 (FIG. 2b). The transverse stay 63 of the intermediate piece 60 extends parallel to the stay 59, however, it has a shorter distance to the connecting piece 18 of the pressurizing member 11 than the stay 59. The leg 62 facing the housing end face 5 is wider. The abutment surface 64 of the leg 62 has a transition into a slanted surface 65 that connects to the underside 66 of a projection 67 which is aligned with the stay 59 and has the same height as the stay 59.

The end face 68 of the hook leg 54 and the end face 69 of the transverse stay 63 of the intermediate piece 60 facing the housing sidewall 8 are located in a same plane. Furthermore, these end faces 68, 69 are spaced at a short distance from the underside 30 of the connecting piece 18 of the pressurizing member 11.

The two parallel extending slanted surfaces 57 and 65 of the pulling member 12 provide control surfaces via which the pulling member 12 is displaced into its locking position via two control parts 70 and 71 of the control slide 14, as will be described in the following. In the initial position according to FIG. 2b the stay 59 and the projection 67 of the pulling member 12 rest with their planar abutment surfaces 58 and 66 on the planar upper side 72, 73 of the control parts 70, 71 which, in turn, rest on the upper side 56 of the pressurizing member 11. The control part 70 extends from the leg 61 of the intermediate piece 60 to the level of the transition of the slanted surface 57 into the abutment surface 58. The other control part 71 which is substantially shorter than the control part 70 extends from the transition of the slanted surface 65 into the underside 66 of the projection 67 in the direction towards the free end of the projection 67.

The control parts 70, 71 together with the control slide 14 preferably form one unitary part. As can be seen in FIG. 8, the control parts 70, 71 have the same thickness as the two pulling members 12 and 13.

An eccentric part 75 of the actuator 10 extends into the space 74 delimited by the intermediate piece 60. The distance of the transverse stay 63 of the intermediate piece 60 from the pulling member 13 corresponds to the outer diameter of the eccentric 75 (FIG. 2b).

In the initial position the hook 53 of the pulling member 12 is positioned within the housing 3 while the projection 67 as well as the gliding portion 16 extend past the oppositely arranged end face 5 of the housing.

The pulling member 13 is also preferably a stamped part which allows for a simple and inexpensive manufacture. The two pulling members 12 and 13 lie, as can be seen in FIGS. 1, 7 and 8, in a common plane and have the same thickness. Both pulling members rest with their wider sides over a portion of their length at the gliding portion 16 as well as at the control slide 14. The pulling member 13 with its end facing the end face 4 of the housing is provided with a hook 76 which is oppositely oriented to the hook 54 of the pulling member 12. In the initial position according to FIG. 2b, the end face of the hook 76 is aligned with the housing end face 4. The pulling member 13 is otherwise essentially embodied as a stay and extends with its stay body 77 past the oppositely arranged end of the housing 3. The stay body 77 rests at the upper side 35 of the connecting piece 17 of the pressurizing member 11. At its end opposite the hook 76 the stay body 77 is provided with a projection 78 which is oriented opposite to the hook 76 which forms an end abutment for the control part 71 of the control slide 14. As shown in FIG. 2b, the control part 71 in the initial position rests at the projection 78.

A follower 79 extends perpendicularly from the stay body 77 in the area between its two ends. The follower 79 engages the receiving room 74 of the pulling member 12 and, in the initial position according to FIG. 2b, extends to the transverse stay 63 of the intermediate piece 60. In the initial position the follower 79 which is advantageously formed as a unitary part together with the pulling member 13, rests within the area between the eccentric 75 and the leg 62 of the pulling member 12. The abutment 49 as well as the pin 52 extend at a right angle from the stay body 77.

The control slide 14 has an essentially U-shaped contour (FIG. 2c). The control slide 14 rests with its edge 80, that is essentially planar over its entire length, on the upper side 35 of the connecting portion 17 of the pressurizing member 11. The two legs 81 and 82 of the control slide 14 extend to the oppositely arranged connecting piece 18 and rest with their planar end faces 83 and 84 at its underside 30. The transverse stay 85 connecting the two legs 81 and 82 of the control slide 14 is provided with a toothing 86 at its side facing the connecting piece 18. The toothing 86 is engaged by a toothed wheel 87 of the actuator 10.

The leg 81 at its inner side facing the leg 82 is provided with a semi-circular recess 88 which the toothed wheel 87 in the initial position engages partially. The radius of curvature of the bottom 89 of the recess 88 corresponds advantageously to the radius of the toothed wheel 87.

The leg 82 at its outer side facing away from the leg 81 is also provided with a recess 90 the bottom 91 of which is advantageously provided with the same radius of curvature as the bottom 89 of the recess 88.

Both legs 81, 82 of the control slide 14 are provided with respective guide slots 92 and 93 which are identical to one another and have substantially a V-shape. Both guide slots 92, 93 have a guide section which extends essentially parallel to the end faces 83, 84 of the legs 81, 82. At the end facing the housing end face 4 the guide slots have a guide section that is slanted toward the connecting portion 17 of the pressurizing member 11. Pins 94 and 95 engage the guide slots 92, 93 which extend essentially perpendicular from the stays 59 and the projections 67 of the pulling member 12. In the initial position the pins 94, 95 are located at the end of the guide slots 92, 93 facing the housing end face 4.

The pin 43 extends from the leg 81 of the control slide 14 which penetrates the control part 70 and engages the guide slot 42 of the locking slide 15.

The connecting device functions as follows. The end face 4 of the connecting device is placed against the respective support. The actuator 10 which extends past both housing sidewalls 6 and 7 (FIG. 1) can be rotated about its axis with a suitable tool. For this purpose the actuator 10 is rotatably supported within the housing sidewall 6 and 7 with corresponding journals. As shown in FIG. 7, the actuator 10 at both ends may be provided with a means for receiving a wrench for socket head cap screws. When the actuator 10 in the representation according to FIG. 2 is rotated clockwise about its axis, the control slide 14 is displaced in the direction to the housing end face 4 due to the engagement of the toothed wheel 87 within the toothing 86 (FIG. 3c). The pulling member 12 is entrained via the pins 94 and 95. Since the pulling member 12 rests with its transverse stay 63 at the underside 30 of the connecting piece 18 of the pressurizing member, the pins 94, 95 cannot be displaced within the guide slots 32, 33. Via the control parts 70 and 71 of the control slot 14 the pulling member 13 is also entrained (FIGS. 3b and 3c). The hook 76 of the pulling member 13 rests at a distance from the housing end face 4. The hook 53 of the pulling member 12 in this first phase of the displacement of the clamping process extends only slightly past the housing end face 4.

Since the abutment 49 and the pin 52 of the pulling member 13 extend into the slotted holes 48 and 51 of the gliding portion 16 of the pressurizing member 11, they abut after a short displacement, at the ends of the slotted holes 48 and 58 facing the housing end face 4. When the pulling member 13 is further displaced the pressurizing member 11 is entrained. Accordingly, the pressurizing member 11 is displaced to such an extent (FIG. 3a), that its edge 24 is aligned with the housing end face 4. In this position the connecting pieces 17 and 18 of the pressurizing member 11 extend past the housing end face 4, while the pressurizing member 11 with its oppositely arranged end is advantageously aligned with the housing end face 5. When displacing the pressurizing member 11 the springs 45 and 50 are slightly tensioned.

Figure 3A:
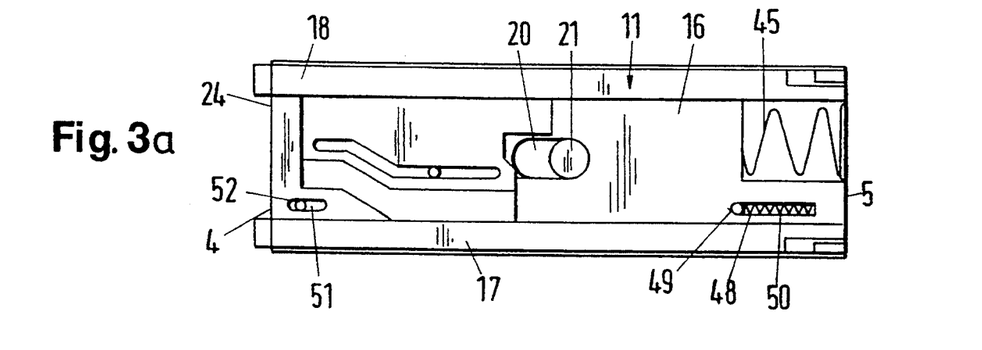
FIGS. 3a-3c to 6a-6c show representations according to FIGS. 2a-2c wherein the individual components of the inventive connecting device are shown in respective positions during the displacement and clamping process.
Figure 3B:
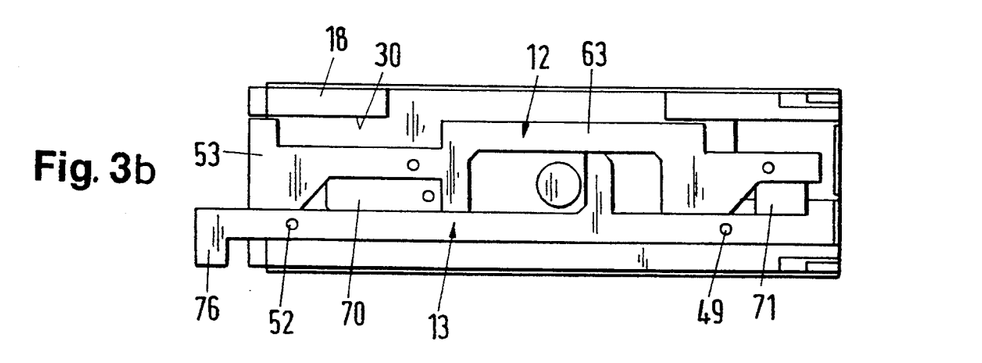
Figure 3C:
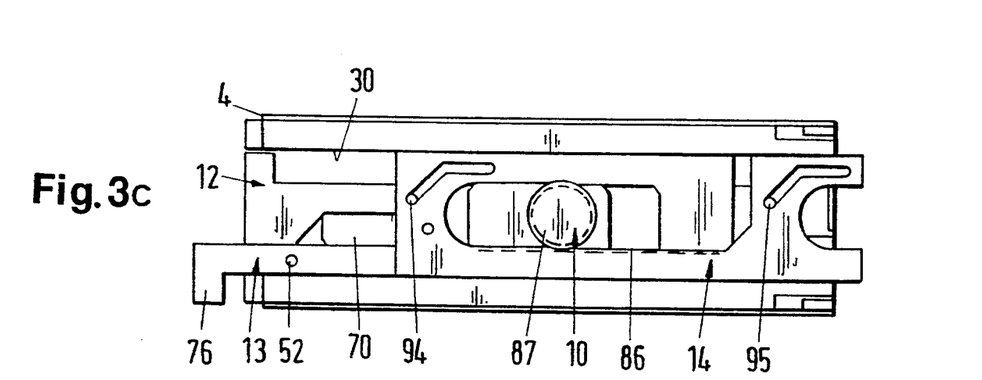

The maximum displacement stroke of the pressurizing member 11 is limited by the abutment of the edge of the slotted hole 20 facing the housing end face 5 at the bearing part 21 of the actuator 10 (FIG. 3a). Since the pressurizing member 11 in this manner is secured against further displacement, the pulling member 13 is also blocked against further displacement because the pin 52 and the abutment 49 are positioned in the aforementioned manner at the respective ends of the slotted holes 48 and 50.

Figure 4A:
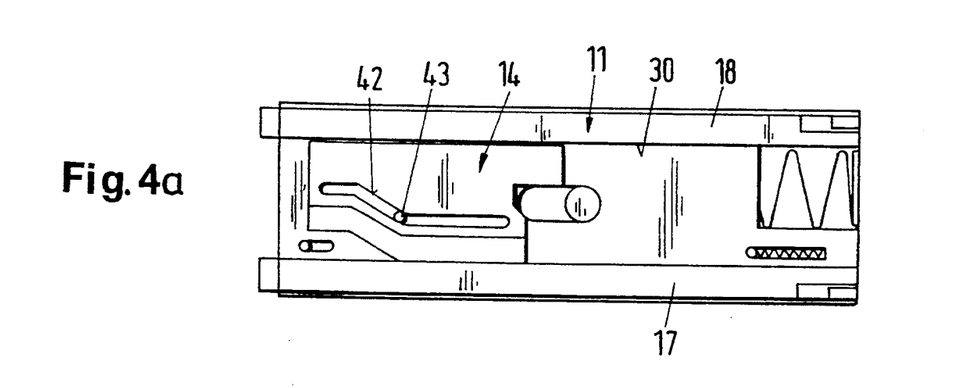
Figure 4B:
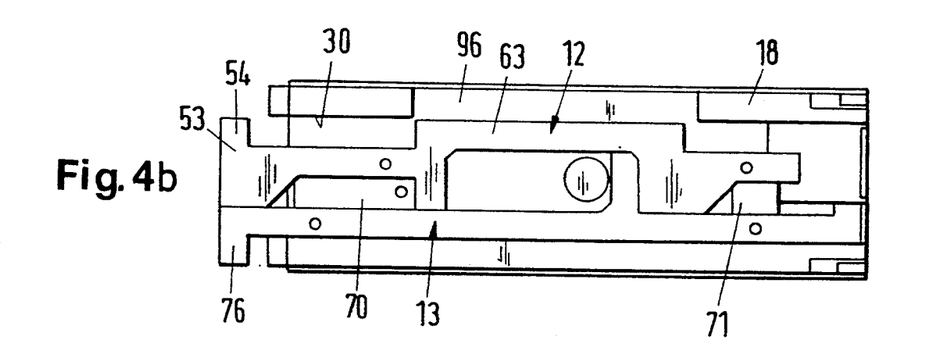
Figure 4C:
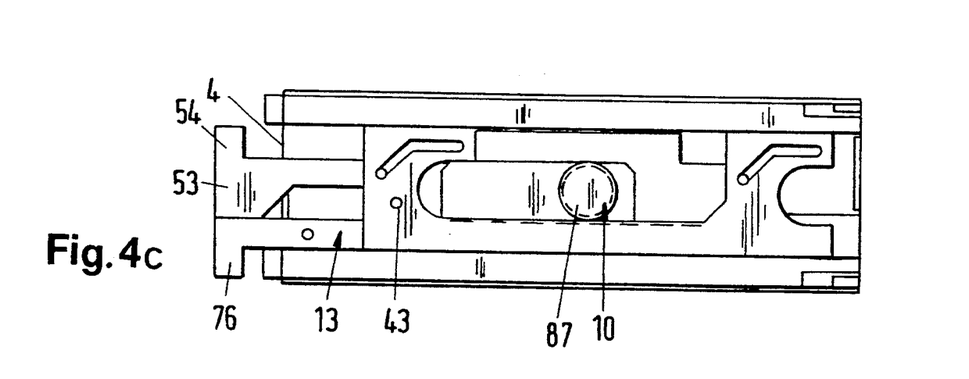

When the actuator 10 is further rotated in a clockwise direction the pulling member 13 remains in its position, while via the toothed wheel 87 the control slide 14 is further displaced in the direction toward the housing end face 4 relative to the pressurizing member 11 (FIGS. 4a–4c). Accordingly, the pulling member 12 is entrained by the control parts 70, 71 of the control slide 14 because the pulling member 12 with its transverse stay 63 still rests at the underside 30 of the connecting portion 18 of the pressurizing member 11. The pin 43 of the control slide 14 is thereby displaced within the portion of the guide slot 42 within the locking slide 15 which extends parallel to the connecting portion 17 of the pressurizing member 11.

The control slide 14 can be displaced to such an extent that the hook 53 of the pulling member 12 and the hook 76 of the pulling member 13 reach the same level (FIGS. 4b and 4c). In this position the two pulling members 12, 13 still rest on one another. The transverse stay 63 of the pulling member 12 has now reached a position (FIG. 4b) in which it is arranged opposite to a recess 96 within the connecting piece 18 of the pressurizing member 11.

When the actuator 10 is now further rotated in a clockwise direction, the control slide 14 is further displaced by the toothed wheel 87 in the direction toward the housing end face 4 relative to the pressurizing member 11. The follower 94, 95 of the pulling member 12 are now upwardly displaced within the slanted guide portions of the guide slots 92, 93 of the control slide 14 so that the pulling member 12 is displaced in the direction toward the connecting piece 18 of the pressurizing member 11. The transverse stay 63 of the pulling member 12 can now engage the recess 96 of the connecting piece 18 (FIG. 5b). As soon as the pins 94, 95 of the pulling member 12 engage the portion of the guide slots 92, 93 that extends parallel to the connecting piece 18, the end position of the pulling member 12 is reached (FIGS. 5b and 5c). The control slide 14 is advantageously farther displaced relative to the pulling members 12, 13 and the pressurizing member 11 such that the pins 94, 95 come to rest within the area of the guide slots 92, 93 that are parallel to the connecting piece 18 of the pressurizing member 11. This results in the prevention of an accidental displacement of the pins 94, 95 into the slanted portion of the guide slots.

The lifting movement of the pulling member 12 is supported by the fact that the control parts 70, 71 of the control slide 14 reach the slanted surfaces 57 and 65 of the pulling member 12 so that they are lifted relative to the pulling member 13. The control slide 14 is displaced such that the control parts 70, 71 are positioned between the two pulling members 12, 13 (FIGS. 5b and 5c). Accordingly, an accidental displacement of the hooks 54, 76 of the pulling members 12, 13 in this locked position in a direction toward one another can be reliably prevented. The connecting device is thus reliably supported at the supports or construction elements 1, 2.

In the position according to FIGS. 4a–4c and 5a–5c the follower 79 of the pulling member 13 rests at the inner sidewall of the leg 82 of the pulling member 12.

When displacing the control slide 14, not only is the pulling member 12 displaced in the aforementioned manner relative to the pulling member 13 into a locked position, but the locking slide 15 is also displaced relative to the pressurizing member 11. Since the control slide 14 with the pin 43 engages the guide slot 42 of the locking slide 15, a forcible displacement of the locking slide is achieved. When displacing the control slide 14 from its position according to FIGS. 4a–4c into the position according to FIGS. 5a–5c, the pin 43 engages the slanted portion of the guide slot 42 so that the locking slide 15 is displaced in the direction toward the connecting piece 17 of pressurizing member 11.

Figure 5A:
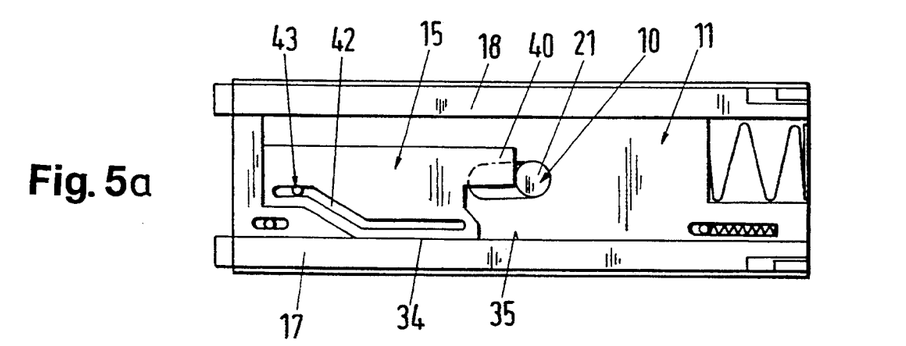
Figure 5B:
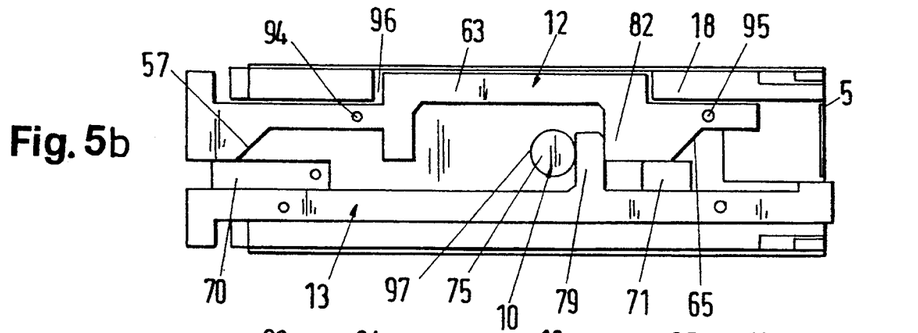
Figure 5C:
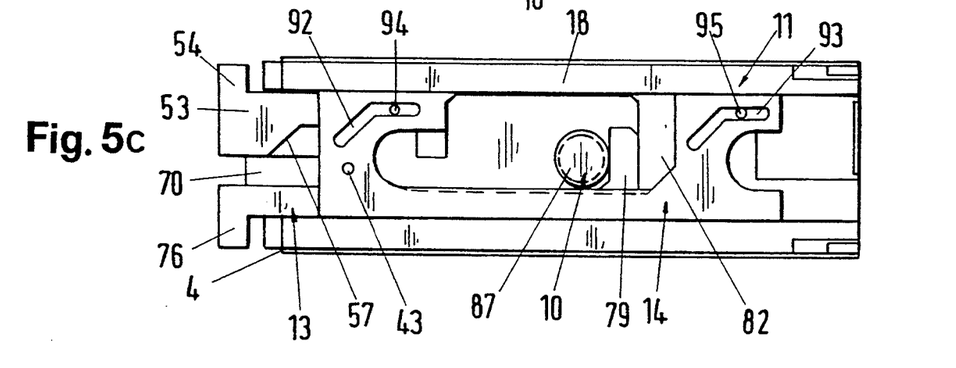

In the resulting end position the locking slide 15 rests with its abutment surface 34 at the upper side 35 of the connecting piece 17 (FIG. 5a). The pin 43 in this position lies within the end section of the guide slot 42 that is parallel to the connecting piece 17 so that an accidental displacement of the locking slide 15 is prevented. In this securing position represented in FIG. 5a the locking projection 40 of the locking slide 15 is positioned before the bearing part 21 of the actuator 10. It is thus prevented that the pressurizing member 11 can be displaced from its position according to FIGS. 5a–5c in the direction to the initial position (FIGS. 2a–2c).

The follower 79 of the pulling member 13 in the position according to FIG. 5b rests at the eccentric 75 of the actuator 10. The eccentric 75 is designed such that upon further rotation of the actuator 10 in the clockwise direction an eccentric surface 97 now becomes effective. This eccentric surface 97 is designed such that it has a positive inclination in the direction of the clockwise rotation. Accordingly, when the actuator 10 is further rotated in the clockwise direction, the pulling member 13 is slightly returned into the housing 3 via the follower 79 and, because the follower 79 rests at the leg 82 of the pulling member 12, the pulling member 12 is also returned into the housing 4 to a minimal extent. The two hooks 54, 76 of the pulling members 12 and 13 are thus displaced in the direction toward the housing end face 4 and the projecting portions 98, 99 of the pressurizing member 11. As can be seen, for example, from FIG. 9, the pulling members 12, 13 are forced in this manner against the support 1 so that the support 1 is clamped between the hooks 54, 76 and the projecting portions 98 and 99 of the pressurizing member 11. The degree of clamping is determined by the positive inclination of the eccentric surface 97 of the eccentric 75.

The support 1 is not overly loaded because forces are exerted on it from both sides via the hooks 54, 76 as well as via the projecting portions 98, 99 of the pressurizing member 11. In this manner, damage to the support 1 within the area of the through opening 100 (FIG. 9) is prevented. The height, respectively, width of the through opening 100 is selected such that the pulling members 12, 13 in the locking position (FIGS. 6 and 9) rest at the edge of the through opening. The control part 70 positioned between the pulling members 12, 13 in the locked position secures the hooks 54, 76 in the clamping position. It is thus impossible that even under great loads the connecting device can be accidentally removed from the support 1. As shown in FIG. 6a, the pin 43 of the control slide 14 is moved upon displacement into the locked position to the end of the guide slot 42 of the locking slide 15. Since during the aforedescribed clamping process the pulling members 12, 13 are slightly returned into the housing 3, the pins 94, 95 of the pulling member 12 before the clamping process (FIG. 5c) still are spaced from the end of the guide slots 92, 93 facing the end face 5 of the housing 3. After the clamping process (FIG. 6c) the pins 94, 95 of the pulling member 12 rest at the end of the guide slots 92, 93.

The connecting device can be connected in a simple manner to the respective support 1, 2. When the two pulling members 12, 13 are moved out of the housing 3 and the pulling members are still resting on one another (FIGS. 4a–4c), the hooks 54, 76 of the pulling members 12, 13 can be easily inserted into the through opening 100. The distance of the hooks 54, 76 from the projecting parts 98, 99 of the pressurizing member 11 in this position is still greater than the thickness of the support 1, 2. When the pulling member 12 is then moved away from the pulling member 13 in the aforedescribed manner (FIGS. 5a–5c), the hook 54 of the pulling member 12 can effortlessly be moved behind the corresponding edge of the through opening 100 of the support 1, 2. Only after the two hooks 54, 76 of the pulling members 12, 13 have been separated from one another by the control part 70 of the control slide 14, is the aforedescribed clamping process initiated in which the hooks 54, 76 are displaced in the direction toward the projecting portions 98, 99 of the pressurizing member 11 so that thereby the edge of the through opening 100 is clamped between these parts.

The connecting device can also be easily removed from the support 1, respectively, 2. For this purpose, the actuator 10 is rotated counter clockwise so that the control slide 14 via the toothing and toothed wheel is displaced in the reverse direction relative to the housing 3. The locking slide 15 and the pulling member 12 are forcibly displaced into the direction of their initial position by the guide slots 42, 92, 93. Via the pin 52 of the pulling member 14 the pressurizing member 11 is also returned into its initial position represented in FIGS. 2a–2c.

FIGS. 11 to 14 show a further embodiment of a connecting device in which the pulling members are also clamped in direction to the pressurizing member. The connecting device has a housing 3a with sidewalls 6a to 9a. As disclosed for the previous embodiment the housing 3a is relatively flat and has open end faces 4a, 5a.

Figure 14:
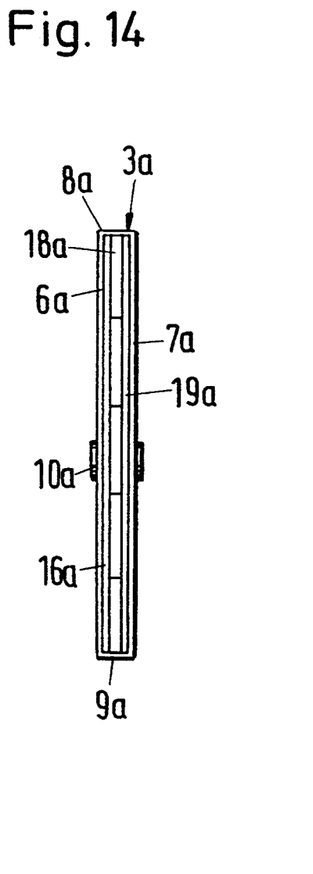
FIG. 14 shows an end view of inventive connecting device according to FIG. 11.

A pressurizing member 11a is displaceably supported within the housing 3a. The pressurizing member 11a has two gliding portions 16a and 19a which are spaced apart and which rest at the inner wall surfaces of the sidewalls 6a and 7a. The two gliding portions 16a, 17a are connected at their longitudinal edges by connecting pieces 17a and 18a. Advantageously, the glide portions 16a, 19a and the connecting pieces 17a, 18a are formed as one unitary part. As in the aforementioned first embodiment, the pressurizing member 11a is preferably made of plastic material. The connecting portions 17a, 18a rest at the inner wall surfaces of the narrow sidewalls 8a and 9a of the housing 3a. At the underside 30a of the connecting piece 18a and at the upper side 35a of the connecting piece 17a the pulling members 12a and 13a rest. In contrast to the first embodiment, the pulling members 12a, 13a are one unitary part. As shown in FIG. 14, the pulling members 12a, 13a rest at the gliding portions 16a and 19a of the pressurizing member 11a facing one another.

Figure 11:
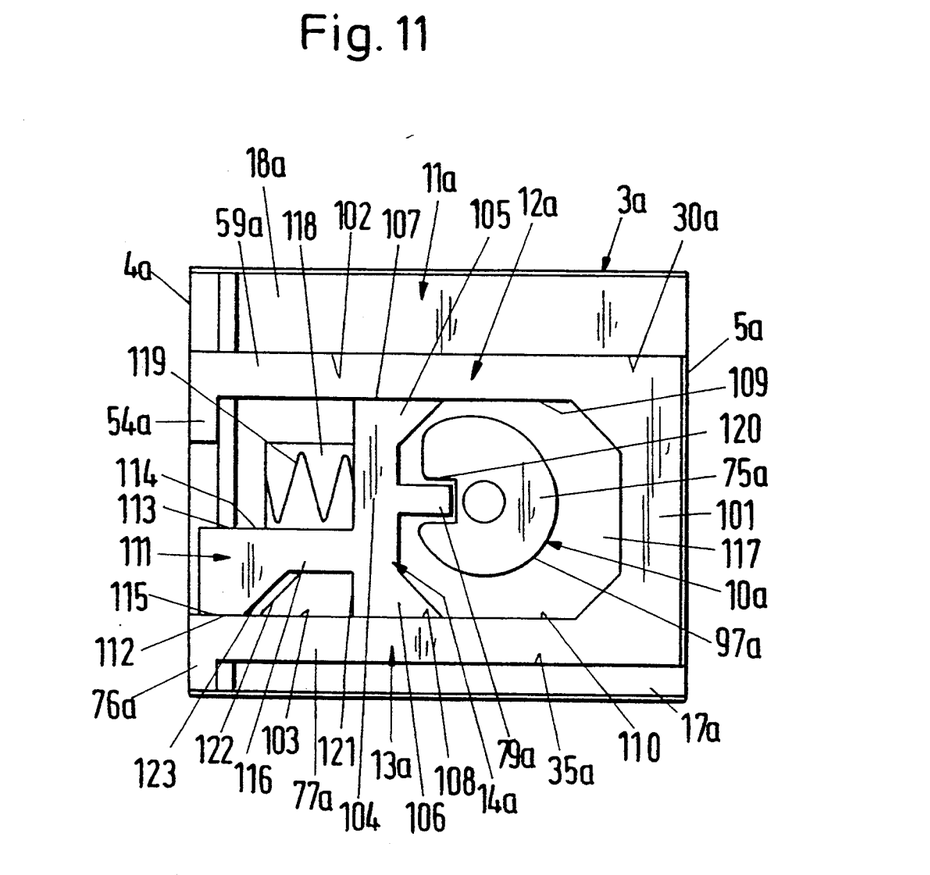
FIG. 11 is a longitudinal section of a second embodiment of the inventive connecting device wherein the individual components are shown in the initial position.

The pulling member 12a has a stay 59a which at its free end is provided with a hook 54a that is oriented towards the pulling member 13a. The hook 54a, as in the aforedescribed embodiment, extends perpendicularly from the stay 59a.

The pulling member 13a also is provided with a stay 77a which at its free end has a hook 76a extending in the same direction as the hook 54a.

The two stays 59a, 77a of the pulling members 12a, 13a are connected by a cross bar 101 which extends perpendicularly to the stays 59a, 77a. The pulling members 12a, 13a rest with the outer surfaces of their stays 59a, 77a that are facing away from one another at the underside 30a, respectively, at the upper side 35a of the connecting pieces 17a, 18a of the pressurizing member 11a.

The stays 59a, 77a of the pulling members 12a, 13a penetrate openings 102, 103 within the pressurizing member 11a. In the initial position according to FIG. 11 the hooks 54a, 76a of the pulling members 12a, 13a are recessed within the housing 3a. The pressurizing member 11a also is completely contained within the housing 3a.

The sidewalls 6a, 7a of the housing 3a which extend parallel to one another are penetrated by the actuator 10a (FIG. 14) which is rotatably supported within non-represented journals in the sidewalls. The gliding portions 16a, 19a of the pressurizing member 11a are provided with non-represented slotted holes, as in the first embodiment, through which the actuator 10a extends.

In the area between the stay 59a and the stay 77a the control slide 14a is displaceably arranged. The control slide 14a has a stay 104 which is perpendicular to the displacement direction of the pulling members 12a, 13a and which has at its ends a widened portion 105, 106. These widened portions have planar end faces 107, 108 with which the control slide 14a rests at the inner sidewalls 109, 110 of the stays 59a, 77a facing one another.

The follower 79a extends perpendicularly from the stay 104 of the control slide 14a in the direction toward the housing end face 5a. As in the first embodiment its contour is rectangular.

A locking slide or element 111 is connected to the control slide 14a, both parts preferably being one unitary part. The locking element 111 rests with its planar abutment surface 112 at the inner side 110 of the stay 77a of the pulling member 13a within the area of the hooks 76a. In order to be able to withstand greater loads the locking element 111 widens in the direction away from its abutment surface 112. At the opposite end the locking element 111 rests with a further planar abutment surface 113 at the edge 114 of an opening 115 of the pressurizing member 11a. The locking element 111 is connected via a stay 116 with the control slide 14a. The stay 116 is parallel to the stay 77a of the pulling member 13a.

As shown in FIG. 11, the control slide 14a is positioned within the recess 117 of the pressurizing member 11a. In the initial position according to FIG. 11 the hook 54a, 76a are aligned with the housing end face 4a. The locking element 111 is somewhat recessed relative to the housing end face 4a.

The pressurizing element 11a has a recess 118 in which a pressure spring 119 is positioned. The spring 119 is supported with one end at the pressurizing member 11a and with the other end at the stay 104 of the control slide 14a.

The actuator 10a in the area of the recess 117 is provided with an eccentric 75a which has an eccentric surface 97a. The eccentric 75a has a circumferential recess 120 which is engaged by the follower 79a of the control slide 14a in the initial position. The stay 104 of the control slide 14a in the initial position according to FIG. 11 rests at the bottom 121 of the recess 117 in the pressurizing member 11a.

Figure 12:
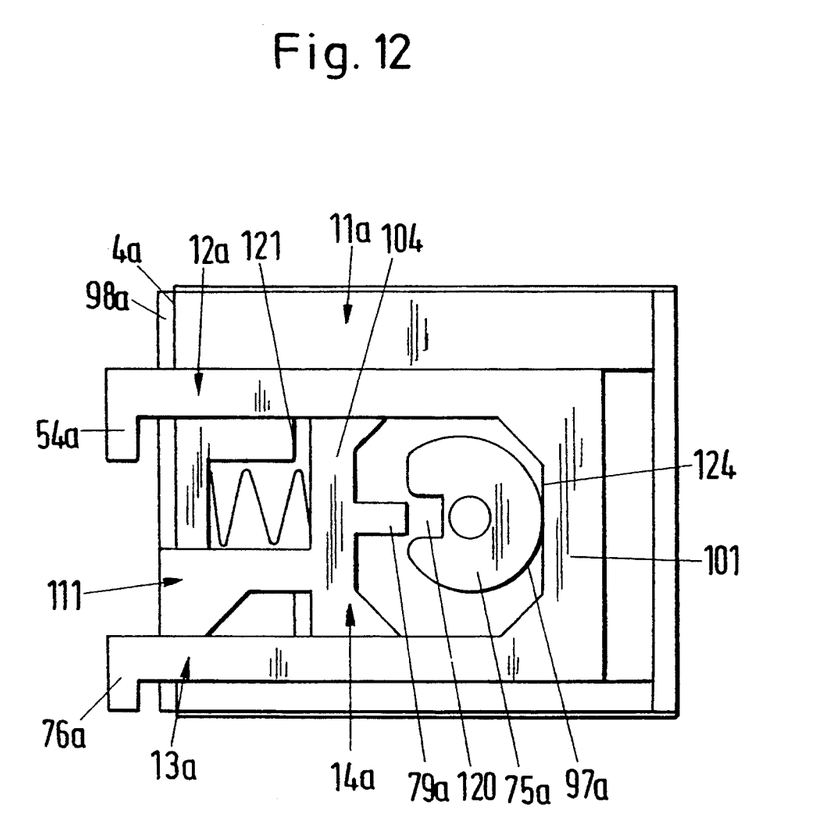
FIGS. 12 and 13 show in a representation according to FIG. 11 the various positions of the individual components of the inventive connecting device of FIG. 11 during the displacement and clamping process.

In order to be able to suspend the connecting device from the support 1 (FIG. 13), the pressurizing member 11a and the pulling members 12a, 13a are manually or by spring force displaced past the housing end face 5a of the housing 3a. The displacement movement of the pressurizing member 11a is delimited by the fact that the bearing parts of the actuator 10a abut at the ends of the slotted holes. In this position the pressurizing member 11a extends with its projecting portions 98a via the housing end face 4a (FIG. 12). Via the cross bar 101 the pulling members 12a, 13a can be displaced relative to the pressurizing member 11a to such an extent that the hooks 54a, 76a are positioned at a distance opposite the projecting portions 98a of the pressurizing member 11a. This distance, as in the previous embodiment, is greater than the thickness of the support 1 within the area of the through opening 100.

When displacing the pressurizing member 11a, a slanted surface 122 (FIG. 11) of the pressurizing member comes into contact with the corresponding slanted surface 123 which is provided at the locking element 111. Accordingly, the locking element 111 and thus also the control slide 14a are entrained (FIG. 12). Since in the initial position (FIG. 11) the two slanted surfaces 122, 123 are spaced apart from one another and the control slide 14a with its stay 104 rests in the aforedescribed manner at the bottom 121 of the recess 117 of the pressurizing member 11a, the stay 104 of the control slide 14a in the displaced position is spaced at a distance from the bottom 121 (FIG. 12). This distance between the stay 104 and the bottom 121 of the pressurizing member 11a is essential for the subsequent clamping process. The control slide 14a is displaced such that its follower 79a is outside of the recess 120 of the eccentric 75a (FIG. 12).

Figure 13:
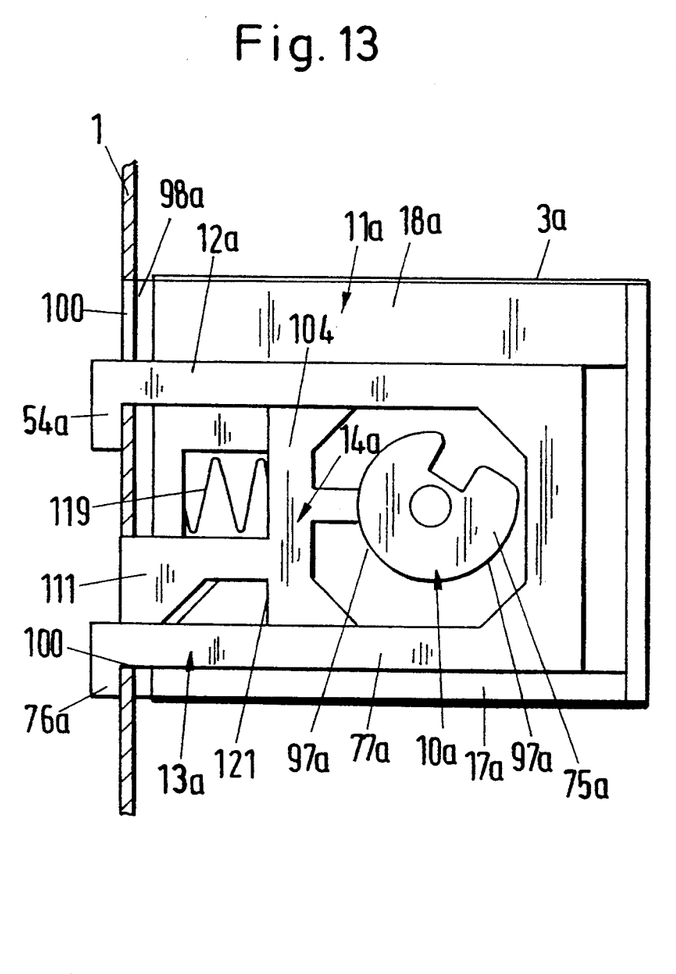

Since the distance between the hooks 54a, 76a and the pressurizing portions 98a is greater than thickness of the edge within the area of the through opening 100 of the support 1, the connecting device can easily be inserted. Subsequently, the actuator 10a is rotated in the clockwise direction whereby the eccentric 97a is pressed against the inner side 124 of the cross bar 101 as well as against the follower 79a. Accordingly, the pulling members 12a, 13a are slightly returned into the housing 3a while the control slide 14a and thus the locking element 111 is moved out of the housing to such an extent that the stay 104 of the control slide 14a rests at the bottom 121 of the pressurizing member 11a (FIG. 13). The control slide 14a is thus displaced against the force of the pressurizing spring 119 whereby the spring force is compensated by the pressurizing member 11a that rests at the bearing parts of the actuator 10a. In this manner, the edge of the through opening 100 of the support 1 is clamped between the hooks 54a, 76a of the clamping members 12a, 13a and the projecting portions 98a. The dimensions of the locking element 111 is selected such that in the clamping position according to FIG. 13 the locking element 111 extends into the through opening 100 of the support 1. Together with the stay 77a of the pulling member 13a the connecting device is thus secured against displacement within this through opening 100.

When it is desired to remove the connecting device, the actuator 10a is rotated in a counter clockwise direction from is position represented in FIG. 13. As soon as the follower 79a is released from the eccentric surface 97a of the eccentric 75a, the pressure spring 119 forces the control slide 14a and thus the locking element 111 back into the housing 3a. When the eccentric 75a assumes the position according to FIGS. 11 and 12, the follower 79a can engage the recess 120 of the eccentric 179a. By returning the eccentric 75a the clamping of the support 1 between the hooks 54a, 76a and the pressurizing portions 98a is released so that the connecting device can be easily removed.

In the returned position (FIG. 11) the hook 54a of the pulling member 12a rests within the housing 3a at the end face of the projecting portion 98a so that the pulling members 12a, 13a are securely positioned within the housing 3a and cannot fall out.

The present invention is, of course, in no way restricted to the specific disclosure of the specification and drawings, but also encompasses any modifications within the scope of the appended claims.

What I claim is:

1. A connecting device for a fastening element having a through opening; said connecting device comprising:
    a housing;
    a first pulling member slidably connected within said housing, said first pulling member comprising a hook for penetrating the through opening and engaging an edge of the through opening from behind;
    an actuator connected within said housing for moving said first pulling member from an initial position into a clamping position, wherein said hook in said clamping position exerts a force onto said edge, said force directed toward said housing;
    at least one pressurizing member slidably connected within said housing so as to be movable into clamping engagement with said first pulling member in said clamping position such that in said clamping position said first pulling member is clamped against said pressurizing member with the fastening element interposed between said first pulling member and said pressurizing member, wherein said pressurizing member has at least one section resting at the fastening element; and
    a means for securing said hook against displacement relative to the through opening of the fastening element.

2. A device according to claim 1, further comprising a spring for biasing said pressurizing member counter to a direction of displacement into said clamping position.

3. A device according to claim 1, further comprising a control slide operatively connected to said pressurizing member for displacing said pressurizing member within said housing.

4. A device according to claim 3, wherein said control slide is forcibly displaced by said actuator.

5. A device according to claim 4, wherein said control slide comprises a toothing and wherein said actuator comprises a toothed wheel, said toothing cooperating with said toothed wheel.

6. A device according to claim 1, wherein said housing has sidewalls and wherein said actuator is rotatably supported within said sidewalls.

7. A device according to claim 1, wherein said actuator extends through said pressurizing member.

8. A device according to claim 7, wherein said pressurizing member has at least one slotted hole through which slotted hole said actuator extends.

9. A device according to claim 1, wherein said means for securing said hook comprises a locking member actuated by said control slide, said locking member cooperating with said first pulling member for securing said hook.

10. A device according to claim 9, wherein said locking member is fixedly connected to said control slide.

11. A device according to claim 10, wherein said locking member and said control slide are one unitary part.

12. A device according to claim 9, further comprising a second pulling member having a hook, said second pulling member connected to said actuator to be moved from an initial position into a clamping position of said second pulling member, wherein said hook of said second pulling member in said clamping position of said second pulling member exerts a force onto said edge, said force directed toward said housing.

13. A device according to claim 12, wherein said first and said second pulling members are slidable relative to one another.

14. A device according to claim 13, wherein one of said first and second pulling members is moved with said locking member into a locked position.

15. A device according to claim 14, wherein said one pulling member has a slanted control surface that is slanted relative to a direction of displacement of said locking member, said one pulling member displaced into said locked position relative to the other pulling member via said slanted control surface by said locking member.

16. A device according to claim 14, wherein said one pulling member is controllably slidable by said control slide.

17. A device according to claim 14, wherein said control slide has two guide slots and wherein said one pulling member has two pins, each said pin engaging one of said guide slots.

18. A device according to claim 3, further comprising a safety device for securing said pressurizing member in said clamping position against displacement.

19. A device according to claim 18, wherein said safety device is a locking slide that is controllably displaced into a securing position by said control slide.

20. A device according to claim 19, wherein said control slide has at least one pin and said locking slide has at least one guide slot, said pin engaging said guide slot.

21. A device according to claim 19, wherein said locking slide has a locking projection that rests in said securing position at said actuator.

22. A device according to claim 19, wherein said pressurizing member has a recess in which recess said locking slide is positioned such that said locking slide is unmovable in a direction of movement of said pressurizing member.

23. A device according to claim 22, wherein said locking slide is displaceable in a direction transverse to the direction of movement of said pressurizing member.

24. A device according to claim 18, wherein said safety device is connected to said control slide.

25. A device according to claim 24, wherein said safety device and said control slide are one unitary part.

26. A device according to claim 24, wherein said pressurizing member has an abutment and wherein said safety device is held in a securing position between said abutment and said actuator.

27. A device according to claim 12, wherein said first and said second pulling members are connected to one another so as form a unitary part.

28. A device according to claim 12, wherein one of said first and said second pulling members has a follower for displacing said first and said second pulling members together into said clamping position.

29. A device according to claim 28, wherein the other of said first and said second pulling members rests at said follower.

30. A device according to claim 28, wherein said actuator comprises an eccentric for displacing said follower.

31. A device according to claim 27, wherein said first and said second pulling members are connected by a cross-bar.

32. A device according to claim 31, wherein said actuator comprises an eccentric cooperating with said cross-bar for displacing said pulling members into said clamping position.

* * * * *